(12) United States Patent
Li et al.

(10) Patent No.: US 9,336,220 B2
(45) Date of Patent: May 10, 2016

(54) ONTOLOGY-BASED DATA ACCESS MONITORING

(71) Applicant: Empire Technology Development LLC, Wilmington, DE (US)

(72) Inventors: Daqi Li, Xi'an (CN); Jun Fang, Xi'an (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/439,898

(22) PCT Filed: May 5, 2014

(86) PCT No.: PCT/CN2014/076771
§ 371 (c)(1),
(2) Date: Apr. 30, 2015

(87) PCT Pub. No.: WO2015/168836
PCT Pub. Date: Nov. 12, 2015

(65) Prior Publication Data
US 2015/0317322 A1    Nov. 5, 2015

(51) Int. Cl.
*G06F 17/00*    (2006.01)
*G06F 17/30*    (2006.01)

(52) U.S. Cl.
CPC .... *G06F 17/30091* (2013.01); *G06F 17/30463* (2013.01)

(58) Field of Classification Search
CPC ............. G06F 17/30274; G06F 17/30277; G06F 17/30424; G06F 17/30572; G06F 17/30463; Y10S 707/99943; Y10S 707/9994
See application file for complete search history.

(56) References Cited

U.S. PATENT DOCUMENTS

| 7,093,200 B2 * | 8/2006 | Schreiber .......... G06F 17/30557 707/E17.032 |
| 7,505,989 B2 * | 3/2009 | Gardner ............ G06F 17/30734 |
| 7,580,918 B2 * | 8/2009 | Chang ............... G06F 17/30958 |

(Continued)

OTHER PUBLICATIONS

Pat Hays, Thomas C. Eskridge, Raul Saavedra, Thomas Reichherzer, Mala Mohrotra, and Dmitri Bobrovnikoff, "Collaborative Knowledge Capture in Ontologies", Oct. 2005, ACM, Proceedings of the 3rd International Conference on Knowledge Capture, pp. 1-8.*

(Continued)

*Primary Examiner* — Cheryl Lewis
(74) *Attorney, Agent, or Firm* — Moritt Hock & Hamroff LLP; Steven S. Rubin, Esq.

(57) ABSTRACT

Technologies are generally described for methods and systems effective to monitor a data access activity. In some examples, a method may include receiving, by a processor, a destination concept. The processor may identify a set of concepts, which may include the destination concept and at least one related concept associated with the destination concept, in an ontology. The processor may generate a planned path, which may define a first data access order associated with access of at least one of the related concepts and the destination concept, using the set of concepts. The processor may generate a browsing path which may define a second data access order associated with the data access activity. The processor may compare the planned path with the browsing path. The processor may determine a deviation based on the comparison of the planned path and the browsing path. The processor may monitor the data access activity using the deviation.

20 Claims, 6 Drawing Sheets

(56) References Cited

U.S. PATENT DOCUMENTS

| | | | |
|---|---|---|---|
| 7,668,850 | B1 | 2/2010 | Bierner |
| 8,452,725 | B2 | 5/2013 | Hatami-Hanza |
| 8,661,060 | B2* | 2/2014 | Weissman ......... G06F 17/30616 707/796 |
| 8,674,993 | B1* | 3/2014 | Fleming ................ G06Q 40/06 345/440 |
| 2005/0055334 | A1 | 3/2005 | Krishnamurthy |
| 2008/0215390 | A1* | 9/2008 | Gipps .............. G06Q 10/06316 705/7.26 |
| 2008/0228830 | A1* | 9/2008 | Hawtin ................. G06Q 10/06 |
| 2011/0119283 | A1 | 5/2011 | Tarachandani et al. |
| 2014/0115011 | A1 | 4/2014 | Buemer et al. |

OTHER PUBLICATIONS

Anupama Mallik, Poornachander Pasumarthi, and Santanu Chaudhury, "Multimedia Ontology Learning for Automatic Annotation and Video Browsing", Oct. 2008 MIR '08: Proceedings of the 1st ACM International Conference on Multimedia Information Retrieval, pp. 1-8.*

"About.com." accessed at https://web.archive.org/web/20140504193751/http://en.wikipedia.org/wiki/About.com, last modified on Apr. 17, 2014, pp. 5.

"LookSmart," accessed at https://web.archive.org/web/20140226132347/https://en.wikipedia.org/wiki/Looksmart, last modified on Sep. 2, 2013, pp. 4.

"Open Dire tory Project." accessed at https://web.archive.org/web/20140403055727/http://en.wikipedia.org/wiki/Open_Directory_Project, last modified on Apr. 1, 2014, pp. 12.

"WordNet," accessed at https://web.archive.org/web/20140428025206/http://en.wikipedia.org/wiki/WordNet , last modified on Apr. 6, 2014, pp. 10.

Berman, F., "From TeraGrid to Knowledge Grid," Communications of the ACM, vol. 44, No. 11, pp. 27-28 (Nov. 2001).

International Search Report and written opinion in the counterpart International Patent Application No. PCT/CN2014/076771, mailed Feb. 25, 2015, 9 pages.

Kaya, A., "Design and Implementation of a Benchmark Testing Infrastructure for the DL System Racer," Proceedings of the KI-2004 International Workshop on Applications of Description Logics (ADL'04), Ulm, Germany, pp. 1-10 (2004).

* cited by examiner

ONTOLOGY-BASED DATA ACCESS MONITORING

CROSS REFERENCE TO RELATED APPLICATIONS

This application is the National Stage filing under 35 U.S.C. §371 of PCT Application Ser. No. PCT/CN2014/076771 filed on May 5, 2014. The disclosure of the PCT Application is hereby incorporated herein by reference in its entirety.

BACKGROUND

Unless otherwise indicated herein, the materials described in this section are not prior art to the claims in this application and are not admitted to be prior art by inclusion in this section.

A user may browse a database to perform a data access activity, such as research, associated with a destination concept. The destination concept may be dependent on at least one related concept. During the browsing, the user may access concepts which may be irrelevant to the destination concept. A data access order of the data access activity may be altered as a result of access of concepts irrelevant to the destination concept.

SUMMARY

In some examples, methods to monitor a data access activity are generally described. The methods may include receiving, by a processor, an indication of a destination concept. The methods may also include identifying, by the processor, a set of concepts in an ontology. The set of concepts may include the destination concept and at least one related concept associated with the destination concept. The methods may also include generating, by the processor, a planned path using the set of concepts. The planned path may be effective to define a first data access order associated with access of at least one of the related concepts and the destination concept. The methods may also include generating, by the processor, a browsing path that may be effective to define a second data access order associated with the data access activity. The methods may also include comparing, by the processor, the planned path with the browsing path. The methods may also include determining, by the processor, a deviation based on the comparison of the planned path and the browsing path. The methods may also include monitoring, by the processor, the data access activity using the deviation.

In some examples, systems configured to monitor a data access activity are generally described. The systems may include a memory configured to store an ontology. The systems may also include a processor that may be configured to be in communication with the memory. The systems may also include a receiver that may be configured to be in communication with the processor. The receiver may be configured to receive an indication of a destination concept. The receiver may be also configured to send the indication of the destination concept to the processor. The processor may be also configured to identify a set of concepts in the ontology. The set of concepts may include the destination concept and include at least one related concept associated with the destination concept. The processor may be also configured to generate a planned path with use of the set of concepts. The planned path may be effective to define a first data access order associated with access of at least one of the related concepts and with the destination concept. The processor may be also configured to store the planned path in the memory. The processor may be also configured to generate a browsing path effective to define a second data access order associated with the data access activity. The processor may be also configured to compare the planned path with the browsing path. The processor may be also configured to determine a deviation based on the comparison of the planned path and the browsing path. The processor may be also configured to monitor the data access activity with use of the deviation.

In some examples, methods to generate a planned path associated with a data access activity are generally described. The methods may include receiving, by a processor, an indication of a destination concept. The methods may also include identifying, by the processor, a set of concepts in an ontology. The set of concepts may include the destination concept and include at least one related concept associated with the destination concept. The methods may also include obtaining, by the processor, knowledge data that may include at least a known concept associated with a user performing the data access activity. The methods may also include searching, by the processor, for the known concept in the set of concepts. When the result of the search indicates a presence of the known concept in the set of concepts, the methods may also include removing, by the processor, the known concept from the set of concepts. The methods may also include generating, by the processor, the planned path based on a result of the search. The planned path may be effective to define a data access order associated with access of at least one of the related concepts and the destination concept.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to ontology-based data access monitoring.

Briefly stated, technologies are generally described for methods and systems effective to monitor a data access activity performed by a user. An example of data access activity may be data access performed or conducted in conjunction with a research on a topic such as, by way of example, differential equations. In some examples, the methods may include receiving, by a processor, an indication of a destination concept. The destination concept may be the topic being researched by the user. The processor may also identify a set of concepts in an ontology. The ontology may be a data structure effective to represent concepts and relationships between concepts. The set of concepts may include the destination concept and at least one related concept, such as Calculus, associated with the destination concept. The processor may also generate a planned path using the set of concepts. The planned path may be effective to define a first data access order associated with access of at least one of the related concepts and the destination concept. For example, the first access order may be to access a first related concept, like Calculus I, then a second related concept, like Calculus II, then the destination concept. The processor may also generate a browsing path by monitoring the data access activity being performed by the user. The browsing path, performed by the user, may be effective to define a second data access order which may be same or different from the first access order defined by the planned path. The processor may also compare the planned path with the browsing path. The processor may also determine a deviation based on the comparison of the planned path and the browsing path. The processor may also monitor the data access activity using the deviation. For example, the processor may determine a deviation between the planned path and the browsing path greater than a threshold and in response, may alert the user that the data access activity may not be following a proper direction.

Figure 1:
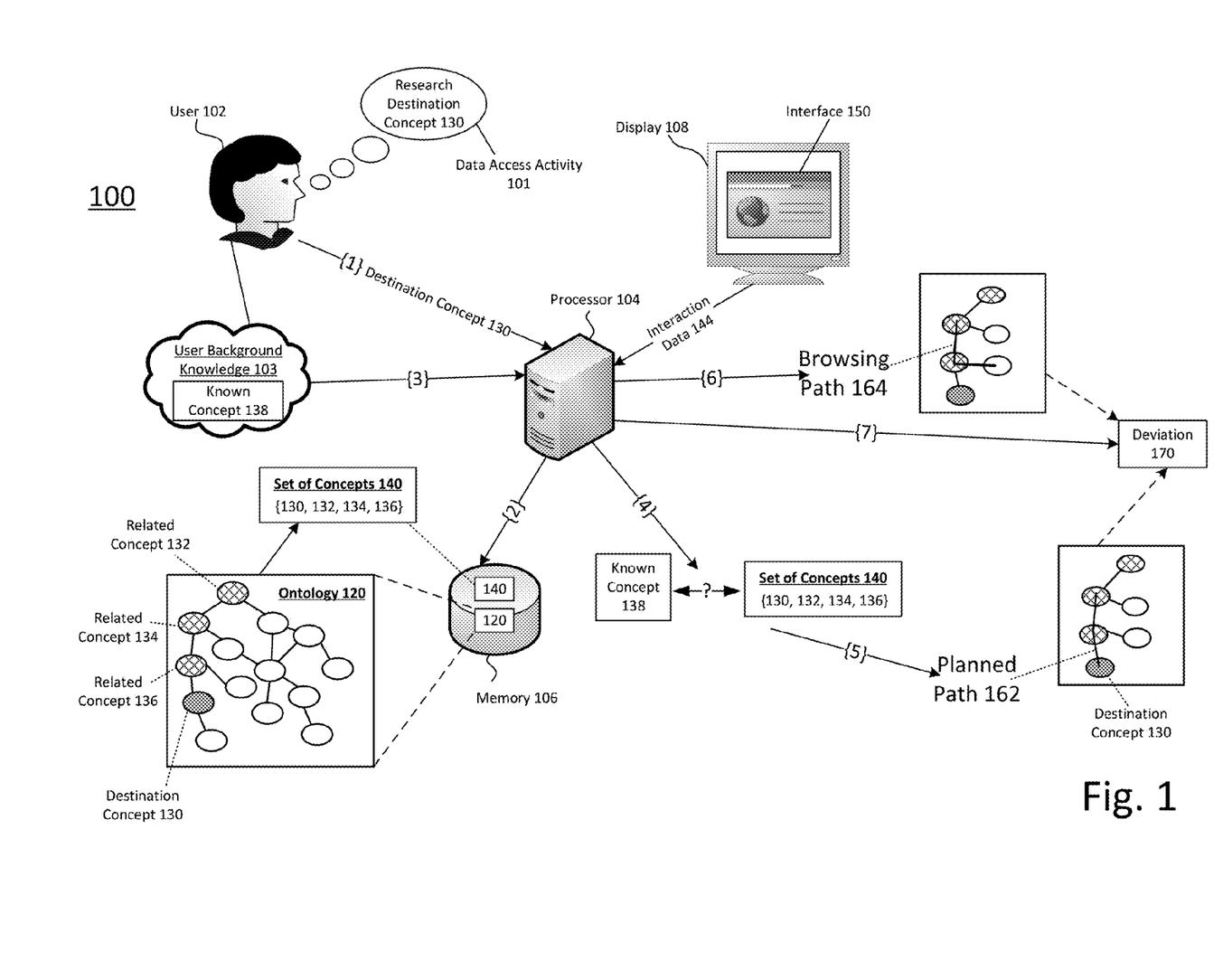
FIG. 1 illustrates an example system that can be utilized to implement ontology-based data access monitoring.

FIG. 1 illustrates an example system that can be utilized to implement ontology-based data access monitoring, arranged in accordance with at least some embodiments described herein. System 100 may be implemented while a user 102 performs a data access activity 101, such as a research of a destination concept 130. As a result of the implementation of system 100, data access activity being performed by user 102 may be monitored by a processor 104. System 100 may include processor 104, a memory 106, and/or a display 108. Processor 104 may be configured to be in communication with memory 106 and/or display 108. Display 108 may be configured to display an interface 150 effective to output information related to data access activity 101. In some examples, interface 150 may be an interface of a data access application or an internet browser. Memory 106 may be configured to store an ontology 120 which, as is described in more detail below, may be a data structure effective to represent concepts and effective to indicate relationships among the represented concepts. Ontology 120 may be processed by processor 104 to produce a graphical representation such as a table, graph, etc. In some examples, a device outside of or external to processor 104 may provide data to processor 104 in order for processor 104 to generate ontology 120. In some examples, ontology 120 may be generated by a device outside of processor 104 and may be stored in a memory outside of system 100.

In the example, user 102 may access data relating to a destination concept 130 during data access activity 101. User 102 may input an indication of destination concept 130 (depicted as operation {1}) to processor 104 such as by using interface 150 displayed on display 108 and/or a keyboard or computer mouse or other input device configured to be in communication with processor 104. Destination concept 130 may be a concept in ontology 120. In response to a receipt of destination concept 130, processor 104 may identify destination concept 130 and one or more related concepts, such as related concepts 132, 134, 136, in ontology 120 (depicted as operation {2}). Related concepts 132, 134, 136 may be concepts related to destination concept 130 based on a respective dependency (described below). In response to the identification of destination concept 130 and related concepts 132, 134, 136, processor 104 may compile a set of concepts 140 which may include the identified destination concept 130 and related concepts 132, 134, 136.

Processor 104 may further obtain user background knowledge 103 from user 102 (depicted as operation {3}), where user background knowledge 103 of user 102 may be data associated with a background of user 102 such as an educational background, hobbies, and/or work experience, etc. In some examples, processor 104 may obtain user background knowledge 103 based on inputs from user 102. In some examples, processor 104 may obtain user background knowledge 103 from a device, which may be outside of processor 104, configured to obtain user background knowledge 103 from user 102. In some examples, processor 104 may obtain user background knowledge 103 by detecting events relating to user 102. User background knowledge 103 may include at least a known concept 138 related to the background of user 102.

In response to obtaining user background knowledge 103, processor 104 may search for known concept 138 in set of concepts 140 (depicted as operation {4}). Processor 104 may generate a planned path 162 (depicted as operation {5}) based on a result of the search for known concept 138 in set of concepts 140. Planned path 162 may be effective to define a data access order which relates to access of destination concept 130 and/or related concepts 132, 134, 136. Processor 104 may be configured to output a representation, such as a graph, of planned path 162 on display 108. Processor 104 may be configured to store planned path 162 in memory 106.

Processor 104 may be configured to obtain interaction data 144 while user 102 performs data access activity 101. Interaction data 144 may be data such as a current concept being accessed by user 102 while user 102 performs data access activity 101. For example, when user 102 is browsing through concepts in ontology 120 using interface 150 displayed on display 108, interaction data 144 may be data relating to a current page displayed by interface 150, a current position of a computer mouse configured to be in communication with processor 104, a position of an eye of user 102, etc. Processor 104 may generate browsing path 164 using interaction data 144 (depicted as operation {6}). Browsing path 164 may be effective to define a data access order which relates to data access activity 101. Processor 104 may be further configured to output a representation, such as a graph, of browsing path 164 on display 108.

In response to generation of browsing path 164, processor 104 may compare browsing path 164 with planned path 162 to determine a deviation 170 (depicted by operation {7}). Deviation 170 may be effective to indicate a difference between planned path 162 and browsing path 164. Processor 104 may use deviation 170 to monitor data access activity 101. For example, deviation 170 may be effective to indicate whether user 102 is accessing concepts in a data access order defined by planned path 162. As will be described in more detail below, in response to processor 104 determining that deviation 170 is greater than a threshold (described below), processor 104 may be configured to issue an alert. For example, processor 104 may instruct interface 150 to output a message informing user 102 that there may be a problem with data access activity 101 such as user 102 accessing a concept irrelevant to destination concept 130.

Figure 2:
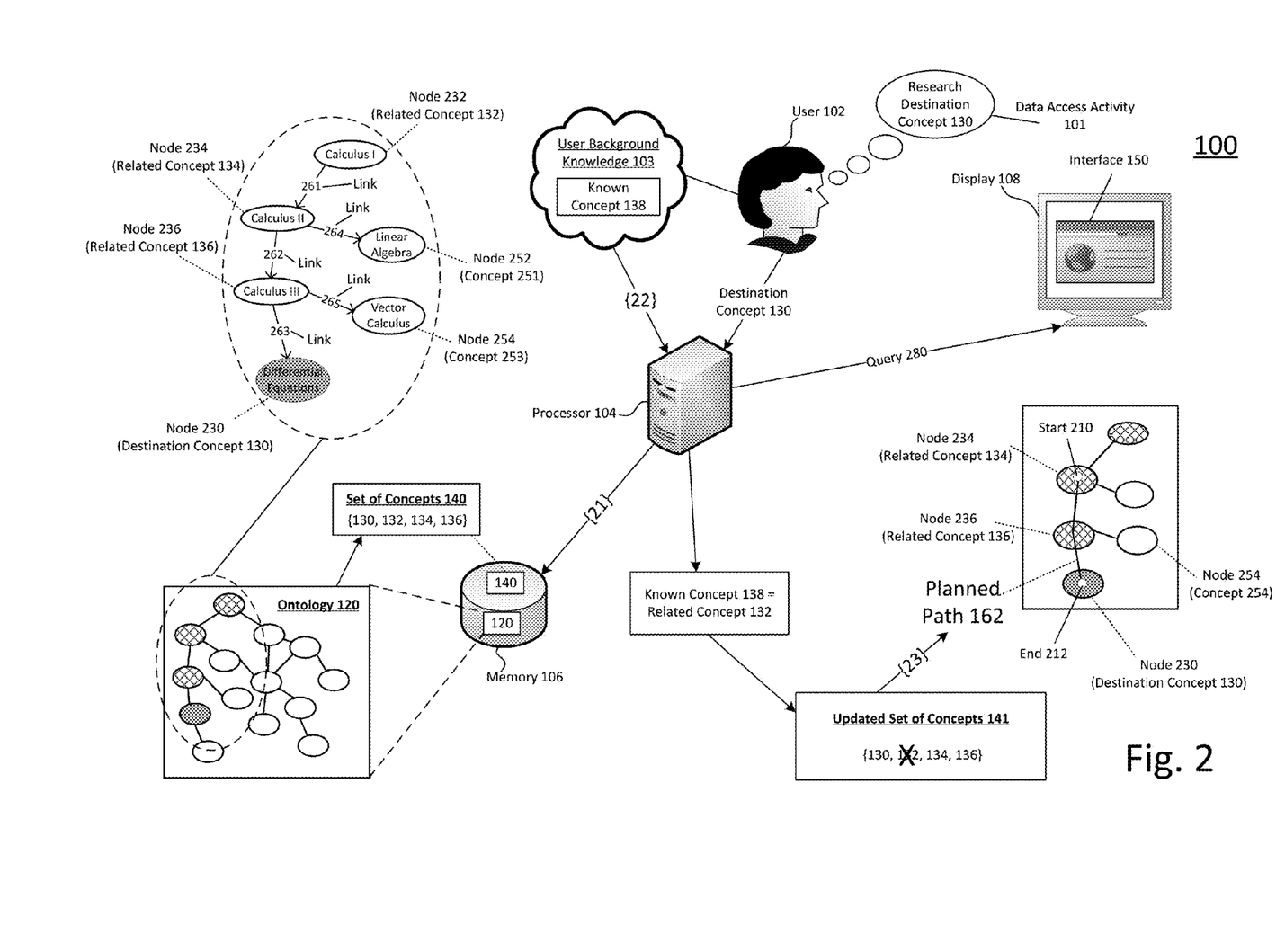
FIG. 2 illustrates the example system of FIG. 1 with additional detail relating to generation of a planned path.

FIG. 2 illustrates example system 100 of FIG. 1 with additional detail relating to generation of a planned path, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Generation of planned path 162 may include identifying, by processor 104, set of concepts 140 in ontology 120 (depicted as operation {21}). Processor 104 may further receive user background knowledge 103 from user 102 (depicted as operation {22}). In response to identification of set of concepts 140 and receipt of user background knowledge 103, processor 104 may use set of concepts 140 to determine a start 210 and an end 212 of planned path 162 in order to generate planned path 162 (depicted as operation {23}).

A representation of ontology 120, such as a graph, may include at least one node, where each node may be effective to represent a concept. For example, a node 230 in ontology 120 may represent a concept of "Differential Equations." A node 232 in ontology 120 may represent a concept of "Calculus I." A node 234 in ontology 120 may represent a concept of "Calculus II." A node 236 in ontology 120 may represent a concept of "Calculus III." A node 252 in ontology 120 may represent a concept 251 of "Linear Algebra." A node 254 in ontology 120 may represent a concept 253 of "Vector Calculus."

The representation of ontology 120 may further include at least a link, where each link may be effective to connect a pair of nodes and may be effective to indicate a relationship between the pair of connected nodes, such as a dependency. A link 261 in ontology 120 may connect node 232 and node 234, and may be effective to indicate a dependence of related concept 134 ("Calculus II") on related concept 132 ("Calculus I"). Dependence of related concept 134 ("Calculus II") on related concept 132 ("Calculus I") may indicate that knowledge of related concept 132 ("Calculus I") is required for learning related concept 134 ("Calculus II"). A link 262 in ontology 120 may connect node 234 and node 236, and may be effective to indicate a dependence of related concept 136 ("Calculus III") on related concept 134 ("Calculus II"). A link 263 in ontology 120 may connect node 230 and node 236, and may be effective to indicate a dependence of destination concept 130 ("Differential Equations") on related concept 136 ("Calculus III"). A link 264 in ontology 120 may connect node 234 and node 252, and may be effective to indicate a dependence of concept 251 ("Linear Algebra") on related concept 134 ("Calculus II"). A link 265 in ontology 120 may connect node 236 and node 254, and may be effective to indicate a dependence of destination concept 130 ("Vector Calculus") on related concept 136 ("Calculus III").

In an example, to identify set of concepts 140, processor 104 may search for destination concept 130 in ontology 120 in response to receipt of destination concept 130 from user 102. Processor 104 may identify destination concept 130 and node 230 in ontology 120 based on a result of the search for destination concept 130 in ontology 120. In response to the identification of destination concept 130, processor 104 may identify links which may be connected to node 230, which represents destination concept 130, in ontology 120. In response to identification of links which may be connected to node 230, processor 104 may analyze the relationship indicated by the identified links. For example, processor 104 may identify link 263, which may be connected to node 230. Processor 104 may analyze link 263 and may determine that destination concept 130 may be dependent on related concept 136, such as by an indication of a direction of link 263 on the representation of ontology 120. For example, link 263 may be pointing at node 230 from node 236, which may be effective to indicate that destination concept 130 depends on related concept 136. Processor 104 may include concept 136 in set of concepts 140 based on the dependency indicated by link 263.

In response to the inclusion of concept 136 in set of concepts 140, processor 104 may identify links, such as links 262, 265, which may be connected to node 236. Processor 104 may analyze link 262 and may determine that related concept 136 may be dependent on related concept 134, such as by an indication of a direction of link 262. Processor 104 may include concept 134 in set of concepts 140 based on the dependency indicated by link 262. Processor 104 may analyze link 265 and may determine that concept 253 may be dependent on related concept 136, such as by an indication of a direction of link 265. Processor 104 may determine that concept 253 may not be related to destination concept 130 based on an absence of a link between node 254 and node 230. Processor 104 may exclude concept 253 from set of concepts 140 based on the dependency between related concept 136 and concept 253, and based on the absence of the link between node 254 and node 230. Processor 104 may continue to identify concepts to be included or excluded in set of concepts 140 based on analysis of links connecting each pair of nodes in ontology 120. Processor 104 may continue until identification of a basic start concept or continue until identification of a start concept identified by user 102. Processor 104 may store set of concepts 140 in memory 106.

Prior to generation of planned path 162, processor 104 may receive user background knowledge 103, which may include at least known concept 138, from user 102. In response to receipt of user background knowledge 103, processor 104 may search for known concept 138 in set of concepts 140. In an example, processor 104 may search for known concept 138 in set of concepts 140 and may determine that known concept 138 is equivalent to related concept 132. In response to the determination of the equivalence between known concept 138 and related concept 132, processor 104 may update set of concepts 140, such as by removal of related concept 132 from set of concepts 140. After removal of related concept 132 from set of concepts 140, to produce updated set of concepts 141 that may include related concepts 134, 136 and destination concept 130. Processor 104 may store updated set of concepts 141 in memory 106. In some examples, in response to an absence of known concept 138 in set of concepts 140, processor 104 may not modify set of concepts 140.

Processor 104 may use updated set of concepts 141 to determine start 210 and end 212 of planned path 162. Processor 104 may sort concepts in updated set of concepts 141 based on dependencies between each pair of concepts updated in set of concepts 141. For example, processor 104 may analyze link 262 between node 234 and node 236, and may analyze link 263 between node 236 and node 230. Processor 104 may assign node 236 to precede node 230, and may assign node 234 to precede node 236 based on the analysis. After sorting of concepts in updated set of concepts 141, processor 104 may assign node 230, which represents destination concept 130, as end 212 of planned path 162. Processor 104 may further assign node 234 as start 210 of planned path 162 based on the sorting of concepts in set of concepts 140. Processor 104 may generate planned path 162 based on the assignment of nodes and may store planned path 162 in memory 106. In some examples, a user, such as user 102, may request processor 104 to retrieve planned path 162 from memory 106 and send planned path 162 to another user of system 100. For example, a student may share a planned path to learn a destination concept with another user.

In some examples, processor 104 may generate more than one planned path 162 such as a first planned path and a second planned path. The first planned path may be effective to define a first access order which may relate to access of concepts in updated set of concepts 141. The second planned path may be effective to define a second access order, which may be different from the first access order, and which may relate to access of concepts in updated set of concepts 141. Processor 104 may output a first representation of the first planned path and may output a second representation of the second planned path, such as in interface 150, on display 108. Processor 104 may further output a query 280 to prompt user 102 to select either the first planned path or the second planned path to facilitate data access activity 101. The two planned paths may provide a user with options on data access activity such as identifying a shortest path, most efficient path, path with the most knowledge, etc.

Figure 3:
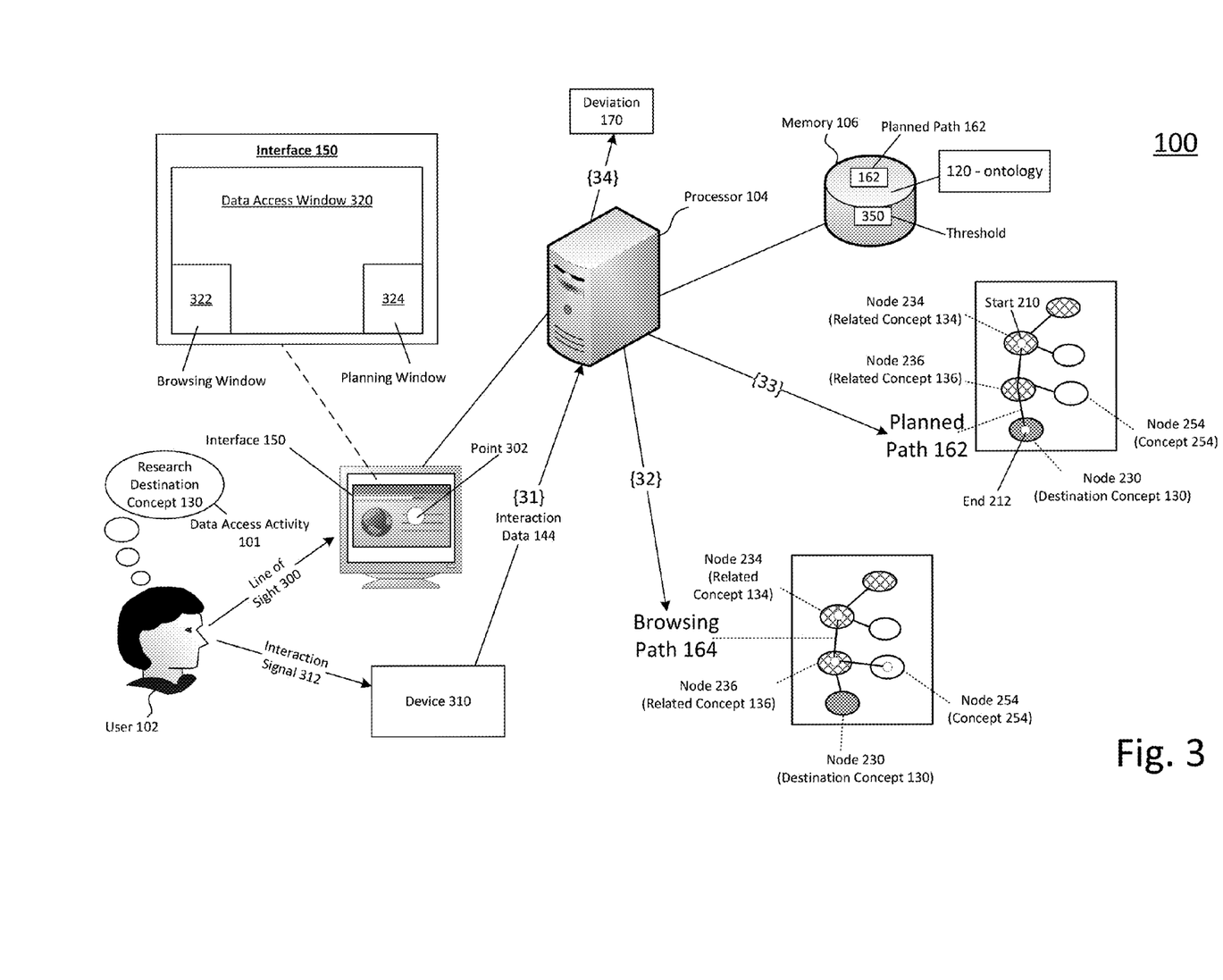
FIG. 3 illustrates the example system of FIG. 1 with additional detail relating to generation of a browsing path and determination of a deviation.

FIG. 3 illustrates example system 100 of FIG. 1 with additional detail relating to generation of a browsing path and determination of a deviation, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

Generation of browsing path 164 may include receiving, by processor 104, interaction data 144 from user 102 and/or from a device 310 configured to detect at least an interaction signal 312 from user 102 (depicted as operation {31}). Device 310 may be an eye tracking device, a computer mouse, a keyboard, a microphone, etc. Interaction signal 312 may be audio signal, infrared signal, tactile signal, etc. Device 310 may be configured to convert interaction signal 312 into interaction data 144 and in response, may send interaction data 144 to processor 104. Processor 104 may receive interaction data 144 and may use interaction data 144 to generate browsing path 164 (depicted as operation {32}). In response to generation of browsing path 164, processor 104 may compare planned path 162 with browsing path 164 (depicted as operation {33}). Processor 104 may determine deviation 170 based on the comparison of planned path 162 with browsing path 164 (depicted as operation {34}). Processor 104 may further use deviation 170 to monitor the data access activity being performed by user 102.

In an example, user 102 may view interface 150 on display 108 through line of sight 300. Device 310 may be an eye tracking device configured to detect a position and/or orientation of a feature, such as an eye, of user 102. As user 102 is viewing a point 302 in interface 150 on display 108, interaction signal 312 may indicate a particular position and/or particular orientation of an eye of user 102. Point 302 may be a portion of interface 150 which may include an indication of a concept. For example, point 302 may be a portion of interface 150 which may include an indication of related concept 134. Device 310 may receive and may convert interaction signal 312 into interaction data 144 which may be data effective to represent the particular position or particular orientation of the eye of user 102. Device 310 may send interaction data 144 to processor 104. Processor 104 may receive and may analyze interaction data 144. Processor 104 may determine that user 102 may be accessing related concept 134 based on an analysis of interaction data 144.

In response to the determination that user 102 may be accessing related concept 134, processor 104 may assign related concept 134 to browsing path 164. Node 234 may be a start of browsing path 164. Device 310 may detect a subsequent interaction signal 312, and may send subsequent interaction data 144 to processor 104. Processor 104 may continue to receive the subsequent interaction data 144 from device 310 and may analyze the subsequent interaction data 144. In the example, based on the analysis of subsequent interaction data 144, processor 104 may determine that user 102 access related concept 136 after access of related concept 134 and in response, may assign related concept 134 to browsing path 164. Processor 104 may determine that user 102 accessed concept 254 after access of related concept 136 and in response, may assign related concept 136 to browsing path 164. Processor 104 may generate browsing path 164 based on the assignment of nodes to browsing path 164.

Processor 104 may compare planned path 162 with browsing path 164. In some examples, processor 104 may compare planned path 162 with browsing path 164 in response to a concept being assigned to a node of browsing path 164. In some examples, processor 104 may be configured to compare planned path 162 with browsing path 164 periodically, such as every one minute. Comparison of planned path 162 with browsing path 164 may include identifying, by processor 104, a particular node in browsing path 164. Processor 104 may determine whether the particular node is also in planned path 162. For example, processor 104 may identify node 234 in browsing path 164 and may determine that node 234 is present in planned path 162. Processor 104 may continue to identify a subsequent node in browsing path 164. Processor 104 may identify node 236 in browsing path 164 and may determine that node 236 is present in planned path 162. Processor 104 may identify node 254 in browsing path 164 and may determine that node 254 is absent from planned path 162 indicating that user 102 has deviated from planned path 162.

In response to the determination of an absence of node 254 in planned path 162, processor 104 may determine a distance between node 254 and a node in planned path 162 that may be a nearest node to node 254. In the example, a node in planned path 162 that may be a nearest node to node 254 is node 236. Processor 104 may determine a distance between node 254 and node 236 in ontology 120, which may result in a distance of "1".

Processor 104 may determine deviation 170 using the distance between node 254 and the nearest node, which in the example is node 236, in planned path 162. In some examples, distance between nodes in ontology 120 may be indicated as a number of nodes and/or may be based on a number of links between nodes. For example, node 254 may be one node away from node 236 due to a presence of one link—a link between node 236 and node 254. In the example, deviation 170 may be a rating, such as a number, effective to represent the distance determined by processor 104. For example, when the distance between node 254 and node 236 is one node, deviation 170 may be a number of "1".

Memory 106 may further store a threshold 350 which may be a cutoff value relating to distance between a node in browsing path 164 and node 230. For example, when threshold 350 is of a value of "1", processor 104 may determine that there is a problem with data access activity 101 when a node of browsing path 164 is one or more nodes away from planned path 162. Processor 104 may compare deviation 170 with threshold 350 to monitor data access activity 101. In the example where threshold 350 is a value of "1". Processor 104 may compare deviation 170 of "1" with threshold 350 of "1" and may determine that deviation 170 is equal to or greater than threshold 350. In response to the determination that deviation 170 is equal to or greater than threshold 350, processor 104 may issue an alert such as a sound, or a message to be displayed in interface 150, to alert user 102 that the data access activity being performed by user 102 is deviated from planned path 162.

In some examples, interface 150 may include a data access window 320, a browsing window 322, and/or a planning window 324. While user 102 performs data access activity 101 using data access window 320 of interface 150, processor 104 may output a representation, such as a graph, of planned path 162 in planning window 324. Processor 104 may further output a representation, such as a graph, of browsing path 164 in browsing window 322. User 102 may view planned path 162 and/or browsing path 164 while performing data access activity 101.

Among other possible benefits, a system in accordance with the disclosure may benefit users who wish to research a destination concept. In an example where a user wishes to research a destination concept, the system may provide guidance for the user to retrieve data relating to the destination concept. The system may benefit the user such that the user may avoid omitting data which may be necessary to understand the destination concept. The system may benefit the user by providing a planned data access path which may be tailored to a background of the user. The system may benefit the user by alerting the user when the user is accessing data which may be unrelated to the destination concept and prevent a user from being distracted. The system may remove concepts which are known by the user. The system may also benefit educational professionals such as an instructor. An instructor may generate and share a planned path and may share the planned path with students in order for the students to study a destination concept efficiently.

Figure 4:
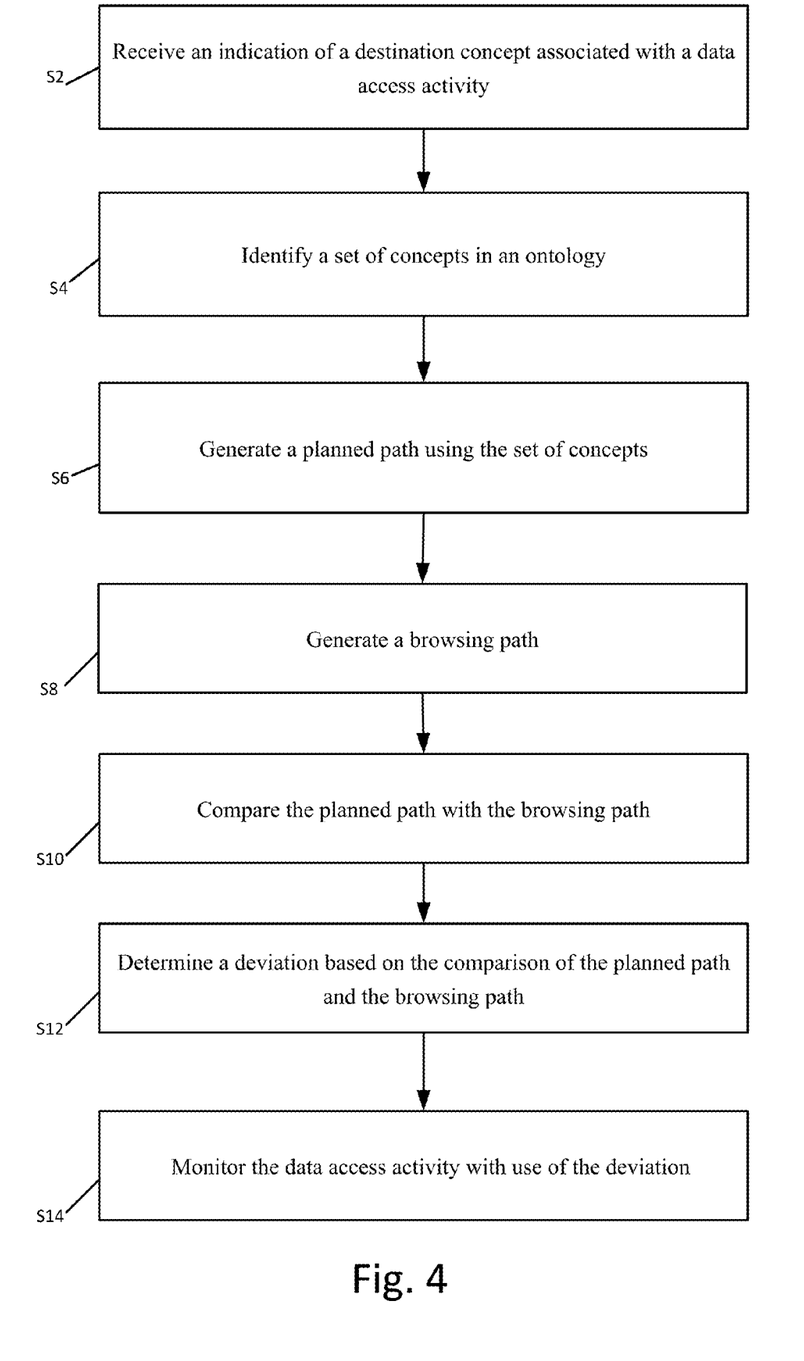
FIG. 4 illustrates a flow diagram for an example process for implementing ontology-based data access monitoring.

FIG. 4 illustrates a flow diagram for an example process for implementing ontology-based data access monitoring, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, and/or S14. Although illustrated as discrete blocks, various blocks may be divided into additional blocks, combined into fewer blocks, or eliminated, depending on the desired implementation.

Processing may begin at block S2, "Receive an indication of a destination concept associated with a data access activity". At block S2, a processor may receive an indication of a destination concept associated with a data access activity.

Processing may continue from block S2 to block S4, "Identify a set of concepts in an ontology". At block S4, the processor may identify a set of concepts in an ontology. The set of concepts may include the destination concept and may include at least one related concept associated with the destination concept. A relationship between the destination concept and at least one of the related concepts may be based on a dependency. The processor may further obtain knowledge data which may include at least a known concept associated with a user. The data access activity may be performed by the user. The processor may search for the known concept in the set of concepts.

Processing may continue from block S4 to block S6, "Generate a planned path using the set of concepts". At block S6, the processor may generate a planned path using the set of concepts. The planned path may be effective to define a first data access order associated with access of at least one of the related concepts and with the destination concept. In some examples, the processor may generate the planned path based on a result of the search of the known concept in the set of concepts. In response to a presence of the known concept in the set of concepts, the processor may remove the known concept from the set of concepts.

Processing may continue from block S6 to block S8, "Generate a browsing path". At block S8, the processor may generate a browsing path that may be effective to define a second data access order associated with the data access activity. The processor may receive first interaction data which may be associated with a first access of a first concept. The processor may receive second interaction data which may be associated with a second access of a second concept. The processor may generate the browsing path using the first and second interaction data.

Processing may continue from block S8 to block S10, "Compare the planned path with the browsing path". At block S10, the processor may compare the planned path with the browsing path.

Processing may continue from block S10 to block S12, "Determine a deviation based on the comparison of the planned path and the browsing path". At block S12, the processor may determine a deviation based on the comparison of the planned path and the browsing path. The processor may compare the deviation with a threshold.

Processing may continue from block S12 to block S14, "Monitor the data access activity with use of the deviation". At block S14, the processor may monitor the data access activity with use of the deviation. The processor may determine that the deviation is equal to or greater than the threshold, and in response, may issue an alert.

Figure 5:
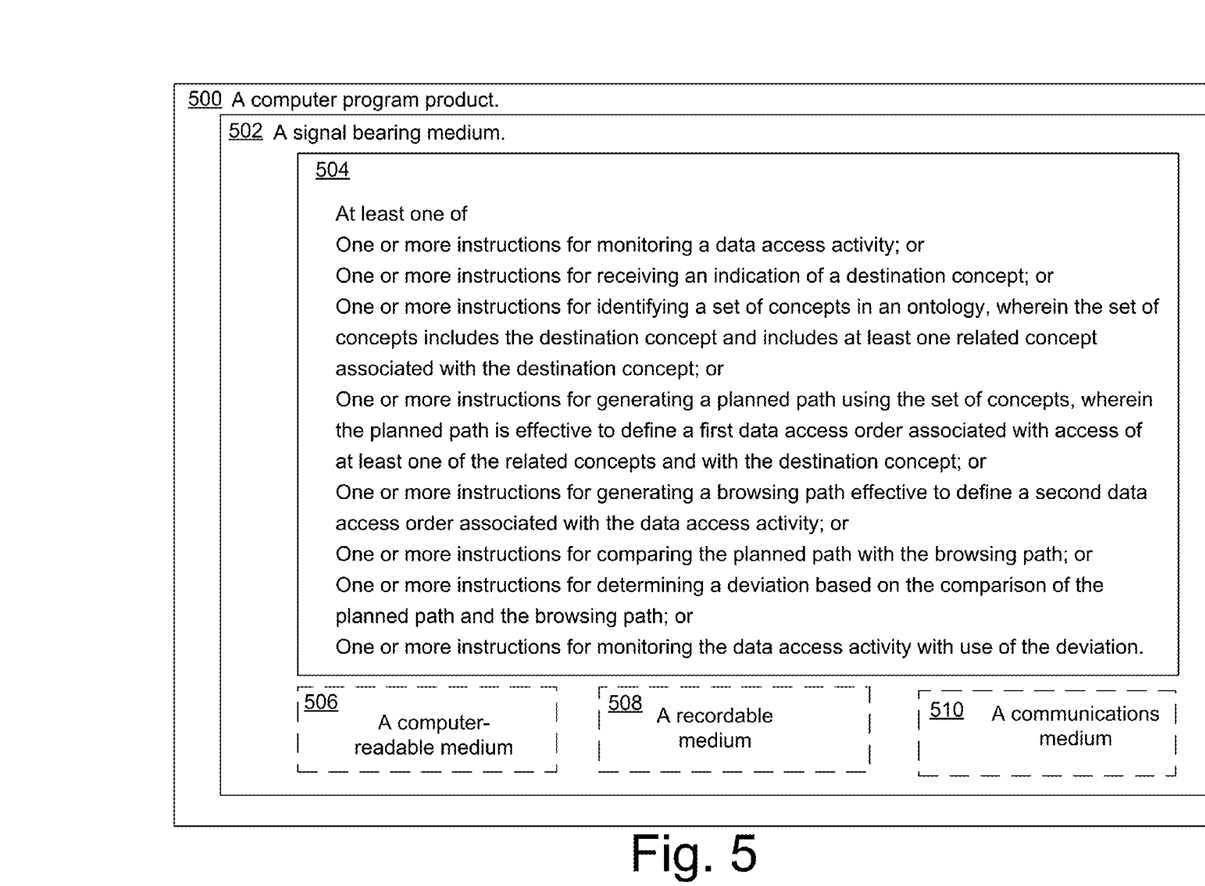
FIG. 5 illustrates an example computer program product that can be utilized to implement ontology-based data access monitoring.

FIG. 5 illustrates an example computer program product that can be utilized to implement ontology-based data access monitoring, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 104 may undertake one or more of the blocks shown in FIG. 4 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
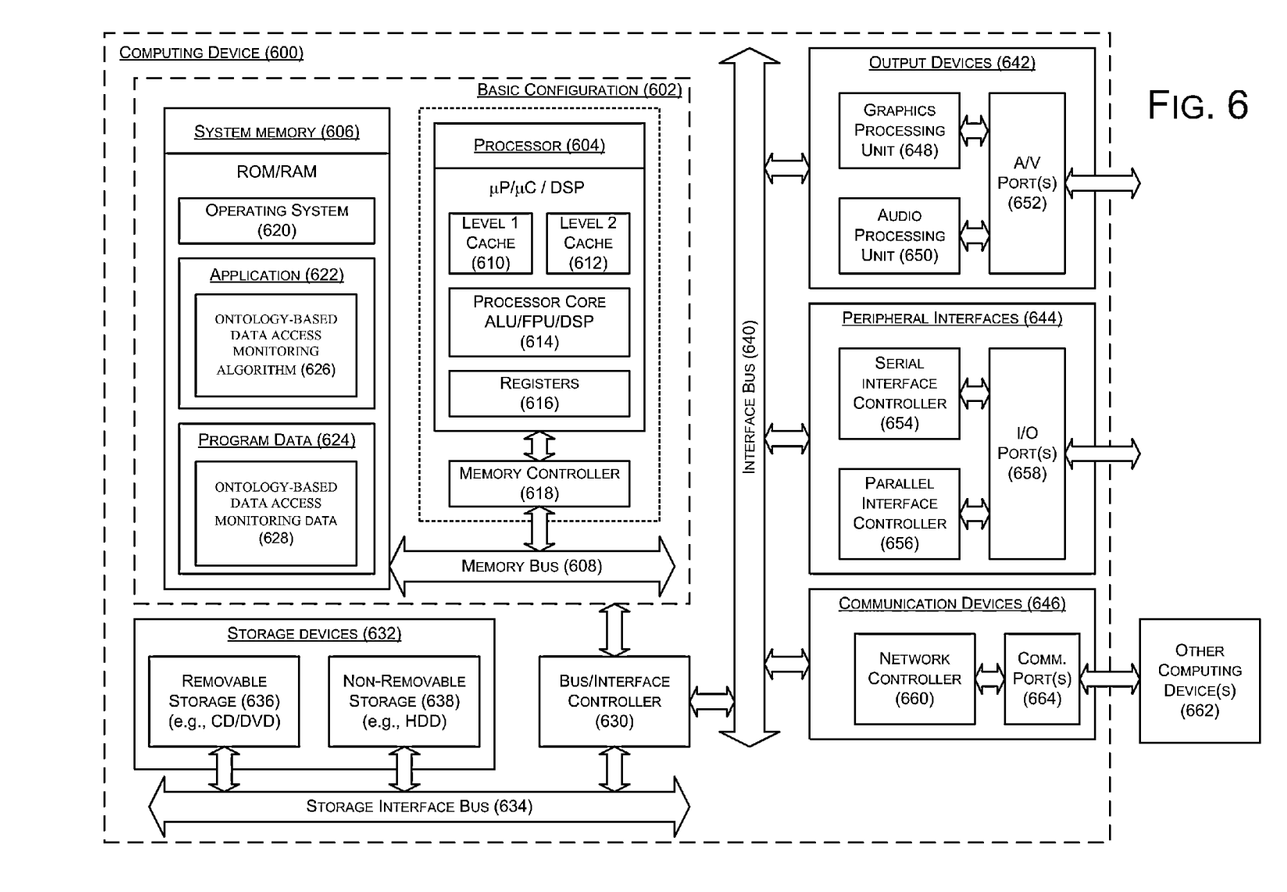
FIG. 6 is a block diagram illustrating an example computing device that is arranged to implement ontology-based data access monitoring, all arranged according to at least some embodiments described herein.

FIG. 6 is a block diagram illustrating an example computing device that is arranged to implement ontology-based data access monitoring, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include ontology-based data access monitoring algorithm 626 that is arranged to perform the functions as described herein including those described with respect to system 100 of FIGS. 1-4. Program data 624 may include ontology-based data access monitoring data 628 that may be useful for implementation of ontology-based data access monitoring as is described herein. In some embodiments, application 622 may be arranged to operate with program data 624 on operating system 620 such that implementations of monitoring data access based on an ontology may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to monitor a data access activity, the method comprising, by a processor:
   receiving an indication of a destination concept;
   identifying a set of concepts in an ontology, wherein the set of concepts includes the destination concept and includes at least one related concept associated with the destination concept;
   generating a planned path using the set of concepts, wherein the planned path is effective to define a first data access order associated with access of at least one of the related concepts and with the destination concept;
   generating a browsing path effective to define a second data access order associated with the data access activity;
   comparing the planned path with the browsing path;
   determining a deviation based on the comparison of the planned path and the browsing path; and
   monitoring the data access activity with use of the deviation.

2. The method of claim 1, wherein a relationship between the destination concept and at least one of the related concepts is based on a dependency.

3. The method of claim 1, further comprising, prior to generating the planned path:
   obtaining knowledge data that includes at least a known concept associated with a user performing the data access activity;
   searching for the known concept in the set of concepts; and
   wherein generating the planned path is based on a result of the search.

4. The method of claim 3, wherein when the result of the search indicates a presence of the known concept in the set of concepts, the method further comprises, removing the known concept from the set of concepts.

5. The method of claim 1, wherein the planned path is first planned path, and the method further comprises:
   generating a second planned path effective to define a third data access order associated with access of at least the one of the related concepts and the destination concept; and
   outputting a query to select either the first planned path or the second planned path.

6. The method of claim 1, wherein the set of concepts includes a first related concept and a second related concept, and the method further comprises:
   determining a first dependency between the first related concept and the destination concept;
   determining a second dependency between the second related concept and the destination concept;
   determining a third dependency between the first related concept and the second related concept;
   sorting the first, second, and destination concepts based on the first, second, and third dependencies; and
   wherein generation of the planned path is based on the sorting of the destination concept, the first concept, and the second concept.

7. The method of claim 1, further comprising outputting a first representation of the planned path on a display and outputting a second representation of the browsing path on the display.

8. The method of claim 1, further comprising:
   determining that the deviation is greater than a threshold; and
   issuing an alert in response to the determination that the deviation is equal to or greater than a threshold.

9. The method of claim 1, wherein the data access activity includes a first access of a first concept and a second access of a second concept, and generating the browsing path comprises:
   receiving first interaction data from at least one device, wherein the first interaction data is associated with the first access of the first concept during the data access activity;
   receiving second interaction data from the at least one device, wherein the second interaction data is associated with the second access of the second concept during the data access activity; and
   generating the browsing path using the first and second interaction data.

10. The method of claim 9, wherein the at least one device includes an eye tracking device.

11. The method of claim 1, wherein the planned path includes a set of nodes, and comparing the planned path with the browsing path comprises:
   identifying a particular node in the browsing path, wherein the particular node represents a particular concept in the ontology;
   determining whether the particular node is in the planned path; and
   wherein determining the deviation comprises, in response to an absence of the particular node in the planned path, determining a distance between the particular node and at least one node among the set of nodes of the planned path.

12. A system configured to monitor a data access activity, the system comprising:
   a memory configured to store an ontology;
   a processor configured to be in communication with the memory;
   a receiver configured to be in communication with the processor, the receiver being configured to:
      receive an indication of a destination concept; and
      send the indication of the destination concept to the processor;
   the processor being configured to:
      identify a set of concepts in the ontology, wherein the set of concepts includes the destination concept and includes at least one related concept associated with the destination concept;
      generate a planned path with use of the set of concepts, wherein the planned path is effective to define a first data access order associated with access of at least one of the related concepts and with the destination concept;
      store the planned path in the memory;
      generate a browsing path effective to define a second data access order associated with the data access activity;
      compare the planned path with the browsing path;
      determine a deviation based on the comparison of the planned path and the browsing path; and
      monitor the data access activity with use of the deviation.

13. The system of claim 12, wherein the processor is further configured to:
   obtain knowledge data that includes at least a known concept associated with user performance of the data access activity;
   search for the known concept in the set of concepts; and
   wherein generation of the planned path is based on a result of the search.

14. The system of claim 13, wherein when the result of the search indicates a presence of the known concept in the set of concepts, the processor is further configured to remove the known concept from the set of concepts.

15. The system of claim 12, wherein the planned path is first planned path, and the processor is further configured to:
   generate a second planned path effective to define a third data access order associated with access of at least the one of the related concepts and the destination concept; and
   output a query to select either the first planned path or the second planned path.

16. The system of claim 12, further comprising a display configured to be in communication with the processor, the processor being further configured to output a first representation of the planned path on the display and outputting a second representation of the browsing path on the display.

17. The system of claim 12, wherein the processor is further configured to:
   determine that the deviation is greater than a threshold; and
   issue an alert in response to the determination that the deviation is equal to or greater than a threshold.

18. The system of claim 12, further comprises at least one device configured to be in communication with the processor, wherein the data access activity includes a first access of a first concept, and a second access of a second concept, the processor being further configured to:
   receive first interaction data from the at least one device, wherein the first interaction data is associated with the first access of the first concept during the data access activity;
   receive second interaction data from the at least one device, wherein the second interaction data is associated with the second access of the second concept during the data access activity; and
   generate the browsing path using the first and second interaction data.

19. A method to generate a planned path associated with a data access activity, the method comprising, by a processor:
   receiving an indication of a destination concept;
   identifying a set of concepts in an ontology, wherein the set of concepts includes the destination concept and includes at least one related concept associated with the destination concept;

obtaining knowledge data that includes at least a known concept associated with a user performing the data access activity;

searching for the known concept in the set of concepts;

when the result of the search indicates a presence of the known concept in the set of concepts, removing the known concept from the set of concepts; and generating the planned path based on a result of the search, wherein the planned path is effective to define a data access order associated with access of at least one of the related concepts and the destination concept.

20. The method of claim 19, wherein the set of concepts includes a first related concept and a second related concept, the method further comprising:

determining a first dependency between the first related concept and the destination concept;

determining a second dependency between the second related concept and the destination concept;

determining a third dependency between the first related concept and the second related concept;

sorting the first, second, and destination concepts based on the first, second, and third dependencies; and wherein generation of the planned path is based on the sorting of the destination concept, the first concept, and the second concept.

* * * * *